United States Patent

Wheeler et al.

[15] 3,662,639

[45] May 16, 1972

[54] SHEARING APPARATUS

[72] Inventors: Donald J. Wheeler, Kent; William Adie, Solon, both of Ohio

[73] Assignee: Roller Shear Corporation, Bedford, Ohio

[22] Filed: Apr. 17, 1970

[21] Appl. No.: 29,488

[52] U.S. Cl............................83/456, 83/487, 83/508, 83/700
[51] Int. Cl............................................B26d 7/02
[58] Field of Search...................83/456, 487, 508, 382, 502, 83/503, 699, 694, 700

[56] References Cited

UNITED STATES PATENTS

| | | | |
|---|---|---|---|
| 1,050,194 | 1/1913 | Wuggenig | 83/456 |
| 727,895 | 5/1903 | Byde | 83/508 X |
| 3,207,019 | 9/1965 | Vanzo et al. | 83/508 X |
| 2,538,972 | 1/1951 | Magnani | 83/508 X |
| 856,719 | 6/1907 | Nagle | 83/694 |
| 1,748,266 | 2/1930 | Wikle | 83/382 |
| 2,109,889 | 3/1938 | Morin | 83/508 X |
| 3,387,524 | 6/1968 | Huck | 83/502 X |

FOREIGN PATENTS OR APPLICATIONS

| | | | |
|---|---|---|---|
| 643,224 | 9/1950 | Great Britain | 83/487 |

Primary Examiner—Frank T. Yost
Attorney—Oberlin, Maky, Donnelly & Renner

[57] ABSTRACT

Shearing apparatus comprises a vertically movable shear assembly for releasably clamping the strip material during shearing, and a transversely movable shear assembly which cooperates with the vertically movable shear assembly to shear the strip material during traversal across the strip. A cam roll track may be provided for supporting one end of the mounting shaft for the transversely movable shear assembly during traversal across the strip material to take the load off the shaft, and electromagnets may also be provided to resist bowing of the rectangular shear blade for the vertically movable shear assembly resulting from separation forces created during shearing without having to provide a large superstructure therefor. The support for the transversely movable shear assembly may be mounted for pivotal movement to permit adjustment of the vertical clearance or overlap between both shear blades, and provision may also be made for adjusting the axial or lateral clearance between such shear blades.

16 Claims, 5 Drawing Figures

INVENTORS
DONALD J. WHEELER
WILLIAM ADIE

BY
Oberlin, Maky, Donnelly & Renner
ATTORNEYS

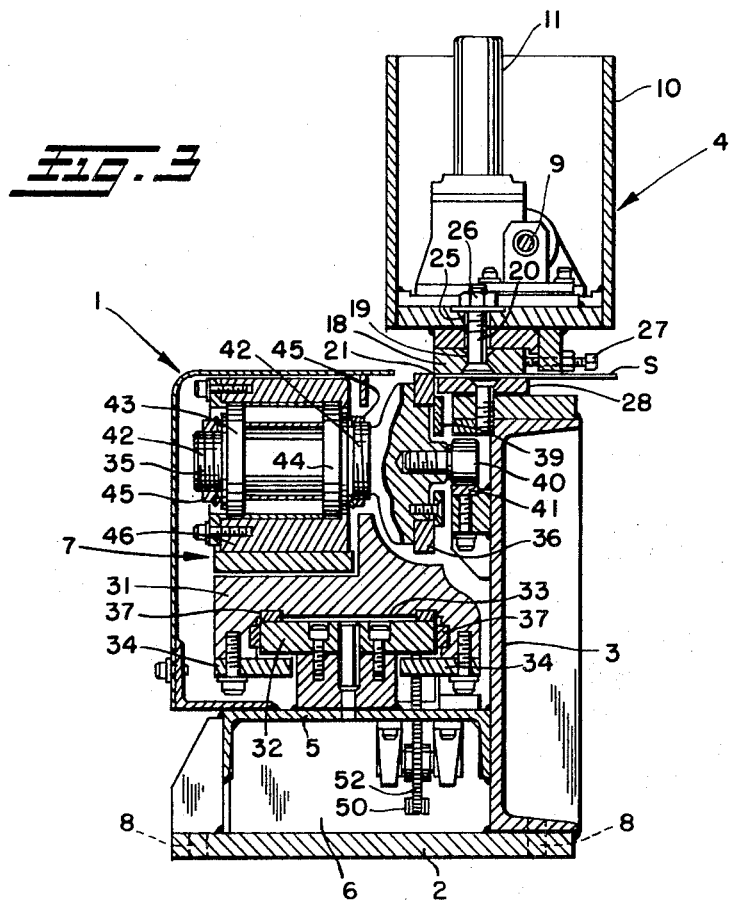
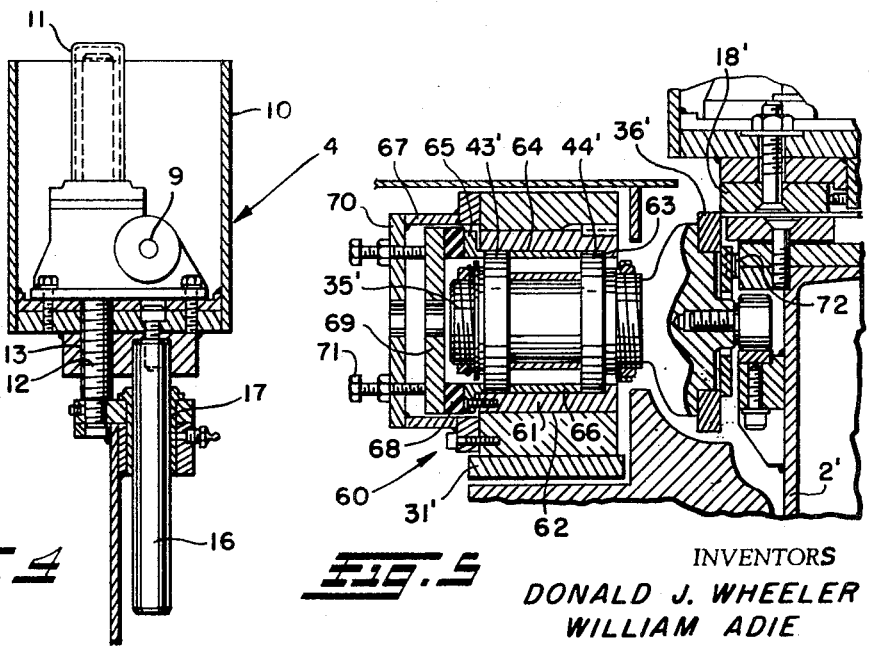

SHEARING APPARATUS

BACKGROUND OF THE INVENTION

This invention relates generally as indicated to shearing apparatus, and more particularly, to certain improvements in such shearing apparatus for shearing various materials such as metal and plastic which may be in the form of strips, sheets, or plates.

There are, of course, many known different types of shearing apparatus for shearing strip and sheet material. However, in recent years size considerations have placed severe restrictions on the selection of shearing apparatus for certain applications, particularly if the shearing apparatus is to be used in a strip processing line in which the amount of available space is quite limited. The initial cost and maintenance required are also very important considerations in the selection of shearing apparatus. An example of a shearing apparatus which was designed with these considerations in mind is disclosed in U.S. Pat. No. 3,476,000, granted Nov. 4, 1969, and such apparatus has met with considerable success. The present invention relates to certain improvements in shearing apparatus of the same general type, as will be made readily apparent in the discussion which follows.

SUMMARY OF THE INVENTION

The present invention has as one of its objects the provision of a shearing apparatus which does not require the usual clamp assemblies for accurately maintaining the material to be sheared in position during the shearing operation. Instead, one of the shear assemblies is mounted for vertical movement into and out of engagement with the material to be sheared for clamping such material during shearing.

Another object is to provide shearing apparatus which may be used to shear material of varying thicknesses and widths without the need for large and heavy support structures for the shear assemblies. The support structure for the transversely movable shear assembly may be made relatively light weight by providing a transversely extending cam roll track on the base of the apparatus for engagement by a roll on the end of the arbor shaft for the transversely movable shear assembly to take the load off the shaft. Electromagnets may also be placed in the support structure of the vertically movable shear assembly or adjacent frame member or both to sandwich the strip material between the rectangular shear blade and adjacent frame member and thereby prevent bowing of the rectangular shear blade despite the high separation forces which may be developed during shearing.

A further object is to provide for adjustment of the relative vertical and lateral clearances between the shear assemblies to permit the apparatus to be used for shearing different types and thicknesses of materials.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 3 is an enlarged transverse vertical section through the apparatus of FIG. 1, taken on the plane of the line 3—3 thereof;

FIG. 4 is an enlarged fragmentary vertical section through the vertically movable shear assembly and support structure therefor; and FIG. 5 is a fragmentary transverse vertical section through a modified form of shearing apparatus constructed in accordance with this invention.

DESCRIPTION OF THE PREFERRED EMBODIMENTS

Figure 1:
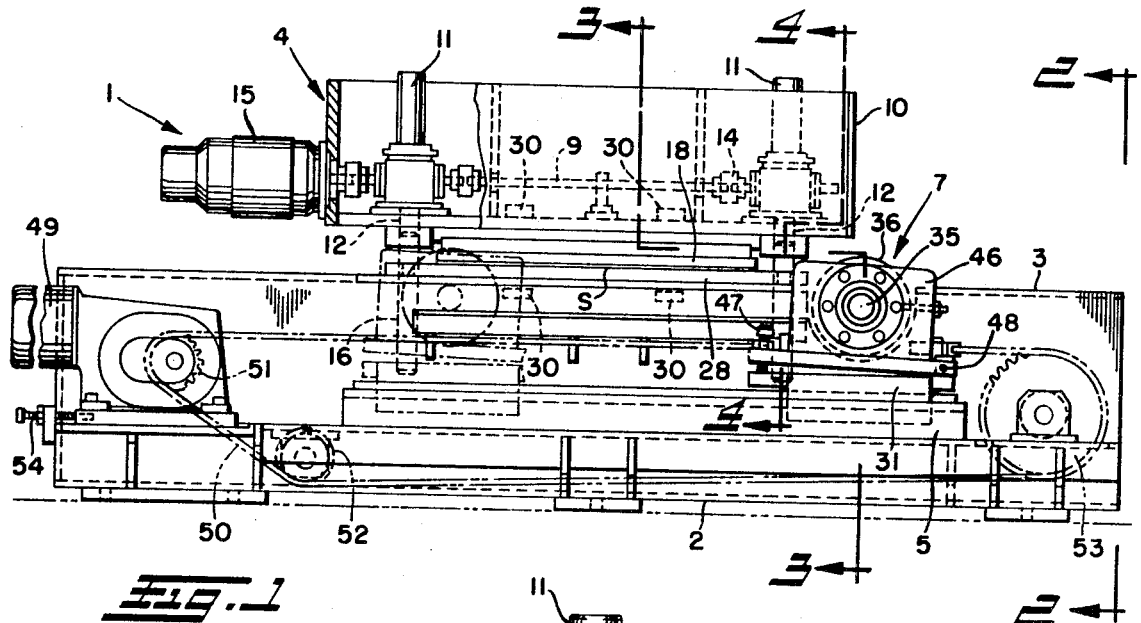
FIG. 1 is a side elevation view of a preferred form of shearing apparatus constructed in accordance with this invention, with portions of the frame for the vertically movable shear assembly broken away to show the raising and lowering mechanism therefor.

Referring now in detail to the drawings, there is shown in FIGS. 1–4 a preferred form of shearing apparatus 1 in accordance with this invention which desirably includes a base member 2 having a first channel-shaped member 3 extending vertically from one side thereof for support of a vertically movable shear assembly 4 above strip pass height, and a second horizontally disposed channel-shaped member 5 extending outwardly from the first channel-shaped member 3 and between the end plates 6 of the base member 2 for supporting a transversely movable shear assembly 7 below strip pass height. Mounting holes 8 may be provided in the base member 2 for bolting or otherwise securing the shearing apparatus in place in a strip processing line or other location.

As best seen in FIGS. 1, 3 and 4, the vertically movable shear assembly 4 consists of an elongated frame member 10 having a pair of spaced apart jacks 11 mounted therein with their rods 12 extending downwardly through openings 13 in the frame member 10 for rigid attachment of the lower ends of the rods to the vertical support member 3. Preferably, the jacks 11 are coupled together using a drive rod 9 and suitable couplings 14 for simultaneous operation of the jacks 11 by a drive motor 15 which raises and lowers the upper shear assembly 4 relative to the base member 2, for a purpose to be subsequently described. A pair of spaced apart guide rods 16 may extend downwardly from the bottom of the frame member 10 for sliding receipt in guide bushings 17 on the support member 3 for guiding the upper shear assembly 4 during such raising and lowering movements.

Also attached to the bottom of the frame member 10 intermediate the jacks 11 and guide rods 16 is a rectangular shear knife or blade 18 having a pair of holes 19 therein, only one of which is shown in FIG. 3, for receipt of mounting bolts 20. Both ends of each hole 19 may be countersunk as shown for receipt of the head end of the mounting bolts 20 so as to permit the rectangular shear blade 18 to be turned over in the event that one of the two front shear edges 21 becomes dull or damaged in use. The mounting holes 25 in the frame member 10 which receive the mounting bolts 20 for the shear blade 18 are also desirably made slightly oversize to permit limited horizontal adjustment of the position of the shear blade by loosening the nuts 26 and moving the shear blade 18 forward or back as desired. One or more adjusting screws 27 may also be provided on the frame member 10 for engagement with the back side of the shear blade 18 to facilitate such adjustment thereof.

Secured to the upper face of the stationary support member 3 in substantial vertical alignment with the upper rectangular shear blade 18 is a backup bar 28 which cooperates with the rectangular shear blade 18 to clamp a strip S interposed therebetween upon vertical downward movement of the shear blade 18 against the backup bar 28. With the strip material S positively clamped between the shear blade 18 and backup bar 28, the strip material S may be sheared by causing the lower shear assembly 7 to traverse the strip in a manner to be more fully described hereafter without the need for separate clamp assemblies to clamp the strip material in position during shearing.

Figure 2:
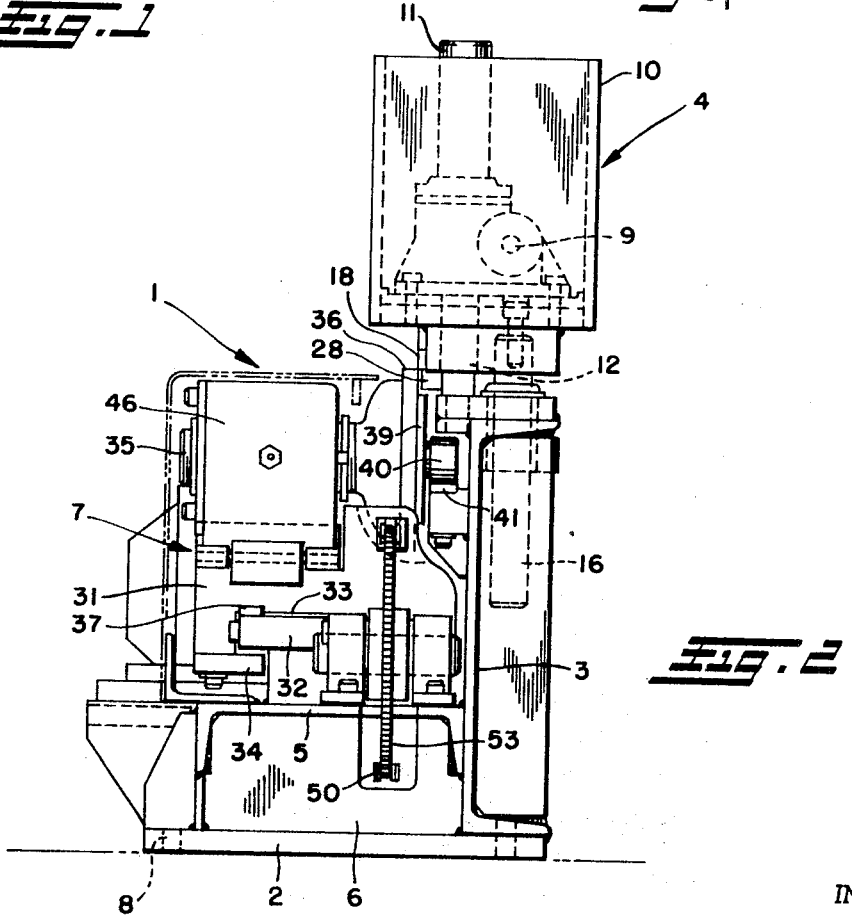
FIG. 2 is an end elevation view of the shearing apparatus of FIG. 1 as seen from the plane of the line 2—2 at the right end of FIG. 1.

The support structure for the vertically movable shear assembly 4 may also be made relatively light weight and compact without fear that the shear blade 18 will be caused to bow due to high separation forces created during shearing of even relatively thick and wide strip material by providing a plurality of electromagnets 30 shown schematically in FIGS. 1 and 2 in such support structure or adjacent stationary support member 3 or both. When energized, the electromagnets 30 will sandwich the strip material therebetween.

The lower shear assembly 7 is desirably mounted on a carriage 31 for sliding movement along a guide bar 32 on the base member 2 which extends transversely of the strip material. As clearly shown in FIGS. 2 and 3, the carriage 31 has a longitudinal slot 33 along the bottom thereof for receipt of the guide bar 32, and retainer plates 34 attached to the bottom edges of the carriages 31 which overlap the edges of the guide bar 32 for retaining the carriage against removal from the guide bar. Wear plates 37 may also be used to line the slot 33 for reducing friction and wear of the carriage and guide bar during movement of the carriage along the guide bar.

Journaled in the carriage 31 is an arbor shaft 35 on which is mounted a circular shear knife or blade 36 that cooperates with the rectangular shear blade 18 of the upper shear assembly 4 during traversal of the lower shear assembly 7 across the strip material to shear the strip material. A retainer plate 39 fastened to the end of the arbor shaft 35 retains the circular shear blade 36 in place on the shaft, but of course such retainer plate 39 may be readily removed to replace the circular shear blade 36 when required. To take the load off the arbor shaft 35 during shearing, a cam roll 40 may be mounted on the end of the shaft outwardly of the circular shear blade 36 for engagement with a track or guideway 41 on the base member 2 extending transversely across the width of the strip material beneath the cam roll. This has the advantage that a smaller arbor shaft and support structure therefor may be used for the circular shear blade than would ordinarily be required for shearing relatively thick materials.

Adjustment of the axial position of the circular shear blade 36 relative to the rectangular shear blade 18 may be obtained by providing threaded portions 42 on the arbor shaft 35 adjacent opposite sides of the bearing mounts 43 and 44 therefor, with lock nuts 45 threaded onto such threaded portions 42 (see FIG. 3). As apparent, by loosening one of the lock nuts 45 and tightening the other, axial movement of the arbor shaft 35 and thus the circular shear blade 36 carried thereby will occur.

Radial adjustment of the circular shear blade 36 may also be obtained for controlling the amount of overlap or vertical spacing between the shear blades 36 and 18 as required for different thicknesses and types of materials by providing a pivotal support 46 on the carriage 31 for the arbor shaft 35. An adjusting screw 47 having threaded engagement with the pivotal support 46 remote from the pivot point 48 abuts against the upper surface of the carriage, whereby rotation of the adjusting screw in opposite directions causes limited raising and lowering of the circular shear blade as desired.

Movement of the carriage 31 back and forth along the guide bar 32 may be achieved in any convenient manner, as by providing a reversible drive motor 49 at one end of the base member 2 as shown in FIG. 1 and suitably connecting the motor to the carriage 31 by a drive chain 50 having its ends secured to opposite ends of the carriage and extending around a drive sprocket 51 on the drive motor 49 and spaced apart idler sprockets 52 and 53 on the base member 2. Set screws 54 may be provided for adjusting the spacing between the drive motor 49 relative to the idler sprocket 53 to take up slack in the drive chain 50.

In FIG. 5 there is shown a modified form of shearing apparatus 60 which may be of a construction generally similar to the shearing apparatus 1 of the FIGS. 1 through 4 embodiment, and accordingly the same reference numerals followed by a prime symbol are used to designate like parts. However, provision is also made in the apparatus of FIG. 5 for obtaining automatic adjustment of the horizontal or lateral clearance between the circular shear blade 36' and rectangular shear blade 18' in accordance with the thickness of the strip material being sheared. As shown, the arbor shaft 35' and bearing mounts 43' and 44' therefor are mounted within a quill or sleeve 61 keyed for axial sliding movement within a bore 62 in the carriage 31'. The bearing mounts 43' and 44' are confined between an internal shoulder 63 in the quill bore 64 and an end cap 65 fastened to one end of the quill, with a spacer 66 between the bearings for maintaining proper spacing therebetween.

A cylindrical housing 67 bolted or otherwise secured to the carriage 31' extends outwardly therefrom in concentric relation to the outer end of the arbor shaft 35'. Contained within the cylindrical housing 67 is a compression member 68 in the form of a rubber-like pad or spring engaging the outer end of the quill 61 for urging the circular shear blade 36' axially toward the rectangular shear blade 18'.

By providing a slight radial overlap between the shear blades as shown, the circular shear blade 36' normally engages the rectangular shear blade 18' when no material is disclosed therebetween. However, during shearing, separation forces are developed between the shear blades urging the circular shear blade 36' away from the rectangular shear blade 18' against the bias of the compression member 68. These separation forces are proportional to the thickness of the material being sheared, and since a greater clearance is required for proper shearing of thicker materials, the desired lateral clearance may be obtained automatically by proper selection of the compression member. The force applied by the compression member may also be varied by providing a compression plate 69 between the compression member 68 and the end wall 70 of the cylindrical housing 67, with adjustment screws 71 extending through the end wall 70 for engagement with the compression plate 69 to permit adjustment of the axial clearance between the end wall and compression plate.

A wedge or cam 72 may be provided on the base member 2' at each end of the carriage 31' run for engagement with the carriage to prevent the circular shear blade 36' from being urged beneath the rectangular shear blade 18' when the rectangular shear blade is raised above strip pass height.

From the foregoing, it will now be apparent that the shearing apparatus of the present invention is of a relatively simple and inexpensive construction which eliminates the need for separate clamps for the strip material during the shearing operation, and provides for ease of adjustment of both the lateral and vertical clearance between the shear blades. Novel support structure is also provided for the arbor shaft of the transversely movable shear blade to permit use of relatively light bearing mounts therefor, and the support structure for the vertically movable shear blade may also be made relatively compact and light weight without experiencing bowing during shearing of even relatively thick material by providing electromagnets and the like to sandwich the strip material between the vertically movable shear blade and stationary support structure.

We claim:

1. Shearing apparatus comprising a stationary support member, a vertically movable shear assembly, means mounting said vertically movable shear assembly for movement into and out of engagement with said stationary support member for clamping the material to be sheared therebetween, a transversely movable shear assembly which cooperates with said vertically movable shear assembly to shear the material during traversal of the material by said transversely movable shear assembly, and means mounting said transversely movable shear assembly for such transverse movement, said stationary support member comprising a base member having a vertically extending channel member which supports said vertically movable shear assembly above the material to be sheared, and a horizontally extending channel member which supports said transversely movable shear assembly below the material to be sheared 2. Shearing apparatus comprising a stationary support member, a vertically movable shear assembly, means mounting said vertically movable shear assembly for movement into and out of engagement with said stationary support member for clamping the material to be sheared therebetween, a transversely movable shear assembly which cooperates with said vertically movable shear assembly to shear the material during traversal of the material by said transversely movable shear assembly, and means mounting said transversely movable shear assembly for such transverse movement, said vertically movable shear assembly comprising a frame member having a rectangular shear blade attached to the bottom thereof, and said stationary support member having a backup bar secured to the upper surface thereof in substantial vertical alignment with said rectangular shear blade.

3. The shearing apparatus of claim 2 wherein said rectangular shear blade has holes therein for receipt of mounting bolts, and the ends of said holes are countersunk for receipt of the heads of said mounting bolts in either end of said holes to permit said rectangular shear blade to be turned over.

4. The shearing apparatus of claim 2 further comprising mounting bolts for securing said rectangular shear blade to said frame member, said frame member having enlarged openings for said mounting bolts to permit lateral adjustment of said rectangular shear blade relative to said transversely movable shear assembly upon loosening said mounting bolts, and adjusting screws carried by said frame member and engageable with the back side of said rectangular shear blade to facilitate such adjustment thereof.

5. The shearing apparatus of claim 2 further comprising electromagnets carried by one of said frame member and stationary support member which when energized resist bowing of said rectangular shear blade due to the high separation forces which are developed during the shearing operation.

6. The shearing apparatus of claim 2 wherein said means mounting said vertically movable shear assembly for vertical movement comprises a pair of jacks carried by said vertically movable shear assembly, said jacks having rods attached to said stationary support member, whereby actuation of said jacks causes said jacks and vertically movable shear assembly to be raised and lowered relative to said stationary support member.

7. The shearing apparatus of claim 2 wherein said transversely movable shear assembly comprises a carriage mounted for transverse movement, and a circular shear blade mounted on said carriage for movement therewith.

8. The shearing apparatus of claim 2 further comprising a guide bar on said stationary support member extending transversely of the material to be sheared, said carriage having a slot along the bottom thereof which slidably engages said guide bar during transverse movement of the carriage along said guide bar, and retainer plates attached to the bottom edges of said carriages which overlap the bottom edges of said guide bar for retaining said carriage against removal from said guide bar.

9. Shearing apparatus comprising a stationary support member, a vertically movable shear assembly, means mounting said vertically movable shear assembly, means mounting said vertically movable shear assembly for movement into and out of engagement with said stationary support member for clamping the material to be sheared therebetween, a transversely movable shear assembly including a circular shear blade which cooperates with said vertically movable shear assembly to shear the material during traversal of the material by said transversely movable shear assembly, and means mounting said transversely movable shear assembly for such transverse movement, said carriage including a pivotal support for said circular shear blade to permit adjustment of the relative vertical position of said circular shear blade with respect to said vertically movable shear assembly.

10. Shearing apparatus comprising a stationary support member, a vertically movable shear assembly, means mounting said vertically movable shear assembly for movement toward and away from said stationary support member, a transversely movable shear assembly which cooperates with said vertically movable shear assembly to shear the material during traversal of the material by said transversely movable shear assembly, means mounting said transversely movable shear assembly for such transverse movement, said transversely movable shear assembly comprising a carriage mounted for transverse movement, a circular shear blade mounted on said carriage for movement therewith, an arbor shaft for said circular shear blade, bearing mounts on said carriage for said arbor shaft, and means mounting said arbor shaft for axial movement on said carriage to permit adjustment of the lateral clearance between said circular shear blade and vertically movable shear assembly, said means mounting said arbor shaft for axial movement comprising spaced apart threaded portions on said arbor shaft adjacent opposite sides of said bearing mounts, and lock nuts threadedly engaging said threaded portions, whereby loosening of one of said lock nuts and tightening of the other will cause axial adjustment of said arbor shaft.

11. Shearing apparatus comprising a stationary support member, a vertically movable shear assembly, means mounting said vertically movable shear assembly for movement toward and away from said stationary support member, a transversely movable shear assembly which cooperates with said vertically movable shear assembly to shear the material during traversal of the material by said transversely movable shear assembly, means mounting said transversely movable shear assembly for such transverse movement, said transversely movable shear assembly comprising a carriage mounted for transverse movement, a circular shear blade mounted on said carriage for movement therewith, a shaft journaled on said carriage for supporting said circular shear blade adjacent one end thereof, a roll on said one end of said shaft outwardly of said circular shear blade, and a track on said stationary support member extending transversely of the material to be sheared for engagement by said roll to take the load off said shaft during shearing.

12. Shearing apparatus comprising a stationary support member, a vertically movable shear assembly, means mounting said vertically movable shear assembly for movement toward and away from said stationary support member, a transversely movable shear assembly which cooperates with said vertically movable shear assembly to shear the material during traversal of the material by said transversely movable shear assembly, means mounting said transversely movable shear assembly for such transverse movement, said transversely movable shear assembly comprising a carriage mounted for transverse movement, a circular shear blade mounted on said carriage for movement therewith, and shear blade mounted on said carriage for movement therewith, and means for adjusting the lateral clearance between said circular shear blade and vertically movable shear assembly for shearing material of different thicknesses, said last-mentioned means comprising a sleeve keyed for axial sliding movement in a bore in said carriage toward and away from said vertically movable shear assembly, said circular shear blade being mounted within said sleeve for movement therewith, and means for biasing said sleeve toward said vertically movable shear assembly, the amount of lateral clearance between said circular shear blade and vertically movable shear assembly depending upon the magnitude of separation forces developed during shearing urging said circular shear blade away from said vertically movable shear assembly in opposition to the biasing means.

13. The shearing apparatus of claim 12 wherein said biasing means comprises a compression member, and means are provided for adjusting the amount of force applied against said sleeve by said compression member.

14. Shearing apparatus comprising a stationary support member, a vertically movable shear assembly, means mounting said vertically movable shear assembly for movement toward and away from said stationary support member, a transversely movable shear assembly which cooperates with said vertically movable shear assembly to shear the material during traversal of the material by said transversely movable shear assembly, means mounting said transversely movable shear assembly for such transverse movement, said transversely movable shear assembly comprising a carriage mounted for transverse movement, a circular shear blade mounted on said carriage for movement therewith, and means for adjusting the lateral clearance between said circular shear blade and vertically movable shear assembly for shearing material of different thicknesses, said circular shear blade normally vertically overlapping said vertically movable shear assembly when at strip pass height, and wedge means at opposite ends of said carriage run for engagement with the carriage to prevent said circular shear blade from being urged beneath said vertically movable shear assembly when raised above strip pass height.

15. Shearing apparatus comprising a stationary support member, a vertically movable shear assembly, means mounting said vertically movable shear assembly for movement toward and away from said stationary support member, a transversely movable shear assembly which cooperates with said vertically movable shear assembly to shear the material during traversal of the material by said transversely movable shear assembly, means mounting said transversely movable shear assembly for such transverse movement, said vertically movable shear assembly comprising a frame member having a rectangular shear blade attached to the bottom thereof, mounting bolts for securing said rectangular shear blade to said frame member, said frame member having enlarged openings for said mounting bolts to permit lateral adjustment of said rectangular shear blade relative to said transversely movable shear assembly upon loosening said mounting bolts, and adjusting screws carried by said frame member and engageable with the back side of said rectangular shear blade to facilitate such adjustment thereof.

16. The shearing apparatus of claim 15 wherein said rectangular shear blade has holes therein for receipt of said mounting bolts, and the ends of said holes are countersunk for receipt of the heads of said mounting bolts in either end of said holes to permit said rectangular shear blade to be turned over.

* * * * *